United States Patent [19]

Murphy et al.

[11] 4,055,049

[45] Oct. 25, 1977

[54] CONSTANT BOILING MIXTURES OF 1,2-DIFLUOROETHANE AND 1,1,2-TRICHLORO-1,2,2-TRIFLUOROETHANE

[75] Inventors: Kevin P. Murphy, Orchard Park; Richard F. Stahl, Hamburg, both of N.Y.

[73] Assignee: Allied Chemical Corporation, Morris Township, N.J.

[21] Appl. No.: 750,758

[22] Filed: Dec. 15, 1976

[51] Int. Cl.$^2$ .................... C09K 5/04; F01K 25/06
[52] U.S. Cl. ............................ 60/651; 252/66; 252/67; 252/305; 252/364; 252/DIG. 9
[58] Field of Search ............... 252/DIG. 9, 67, 66, 252/162, 305, 364; 60/651, 671

[56] References Cited

U.S. PATENT DOCUMENTS

| | | | |
|---|---|---|---|
| 2,479,259 | 8/1949 | Reed et al. | 252/67 |
| 2,641,580 | 6/1953 | Lewis | 252/67 |
| 3,511,049 | 5/1970 | Norton et al. | 60/671 |
| 3,607,768 | 9/1971 | Haase et al. | 252/DIG. 9 X |

OTHER PUBLICATIONS

Stiel et al., "Optimum Properties of Working Fluids for Solar Powered Heat Pumps", Rec. Intersoc. Energy Convers. Eng. Conf., 10th, 1975, pp. 171–177, Chem. Abs. 84:76778q.

*Primary Examiner*—Harris A. Pitlick
*Attorney, Agent, or Firm*—Jay P. Friedenson

[57] ABSTRACT

Constant boiling mixtures of 1,2-difluoroethane and 1,1,2-trichloro-1,2,2-trifluoroethane are useful as power fluids in low temperature Rankine cycles, and as refrigerants, aerosol propellants, expansion agents and solvents.

4 Claims, No Drawings

4,055,049

CONSTANT BOILING MIXTURES OF 1,2-DIFLUOROETHANE AND 1,1,2-TRICHLORO-1,2,2-TRIFLUOROETHANE

BACKGROUND OF THE INVENTION

Methods whereby heat energy, and particularly waste heat energy, is transformed into useful mechanical energy by vapor power (Rankine) cycles is well known. The basic method comprises causing a suitable working or power fluid to pass in heat exchange relationship with a source of heat of sufficient intensity to vaporize the fluid; utilizing the kinetic energy of the expanding vapors to perform work by passing them through a turbine machine or other work producing device, condensing the vapor and pumping the condensed liquid back in heat exchange relationship with the heat source to complete the cycle.

A variety of fluids have been tested in the past as power fluids for this type of application. Water or steam has been the most commercially utilized power fluid. However, the high boiling point, high critical pressure and low density of water or steam limit the power obtainable and result in a need for relatively large and bulky apparatus with these fluids.

A number of organic liquids have been tested as power fluids (e.g. U.S. Pat. Nos. 2,301,404; 3,162,580; 3,234,738; 3,282,048; 3,516,248; and 3,511,049), but there has not been found any single fluid suitable for use as a power fluid which possesses, to the optimum degree, all of the important properties of being thermally stable at elevated temperatures, non-corrosive to ordinary materials of construction and possession of a high Rankine cycle efficiency.

In the development of Rankine cycle systems, the need exists for improved fluids possessing advantageous combinations of properties for Rankin cycle applications, particularly contributing a high Rankine cycle efficiency to the system.

Since no single fluid has been found which is ideal for Rankine cycle applications, the art has turned to the preparation of blends or mixtures of fluids which give novel combinations of properties for Rankine cycle and other applications.

Blends of 1,1-difluoroethane and monochloropentafluoroethane have been evaluated as refrigerants (*World Refrigeration*, February and March 1957), but such blends do not possess a desirable combination of properties for Rankine cycle applications. Blends of 1,1-dichloroethane and 1,1,2-trichlorotrifluoroethane are also known (Canadian Patent No. 832,341), but likewise do not possess a desirable combination of properties for Rankine cycle applications.

Non-constant boiling blends are candidates for Rankine cycle applications, however, non-constant boiling mixtures suffer from the disadvantage that they fractionate during use and during reclamation thereby losing to a greater or lesser extend, one or more of the more volatile components, thereby changing the relative proportion of the components and hence, the properties of the mixtures. The changed properties may be less advantageous from the standpoint of Rankine cycle applications.

The above described problem with non-constant boiling mixtures does not exist with constant boiling (or azeotropic) mixtures. Unfortunately, however, although azeotropic mixtures are advantageous for this reason, as evidenced by the disclosure in U.S. Pat. No. 3,085,065 to Kvalnes, a reliable basis has not been found for predicting the formaton of azeotropes, particularly among halocarbons.

It is an object of this invention to provide a novel fluid mixture which has utility in Rankine cycle applications.

It is another object of this invention to provide novel constant boiling compositions which have application in Rankine cycle systems.

It is another object of the invention to provide constant boiling compositions which have high Rankine cycle efficiencies when used as working fluids in such systems.

Other objects and advantages of the invention will be apparent from the following description.

DESCRIPTION OF THE INVENTION

In accordance with the present invention, we have discovered constant boiling mixtures consisting essentially of about 43 weight percent of 1,2-trichlorotrifluoroethane at 760 mm. Hg. For the purpose of this discussion, by azeotropic or constant boiling is intended to mean also essentially azeotropic or essentially constant boiling. Included within the meaning of these terms are not only true azeotrope described above at 760 mm Hg, but also other compositions containing the same components in different proportions which are true azeotropes at other pressures, as well as those equivalent compositions which are part of the same azeotropic system and are azeotrope-like in their properties. In other words, as will be well recognized in the art, there is a range of compositions containing the same components as the azeotrope, which, not only will exhibit essentially equivalent properties for Rankine cycle and other applications, but which will exhibit essentially equivalent properties to the true azeotropic composition in terms of its constant boiling characteristics or tendency not to fractionate upon boiling.

In view of the constant boiling or essentially constant boiling characteristics of the novel compositions of the invention, these compositions can be recovered after use by distillation without change in composition.

Methods of using the constant boiling compositions of the invention as working fluids in Rankine cycle applications will be obvious and well understood by those of ordinary skill in the art. Such methods essentially involve converting heat energy to mechanical energy by vaporizing the working fluid by passing the same in heat exchange relationship with a heat source and utilizing the kinetic energy of the resulting expanding vapors to perform work. Such methods, however, are not part of this invention. Detailed descriptions of the various Rankine cycle applications and methods of using working fluids in such applications are given in U.S. Pat. No. 3,282,048. Such applications, methods and techniques are applicable herein.

EXAMPLE I

Equal molecular quantities of 1,2-difluoroethane (b.p. 29.6° C./760 mm) and 1,1,2-trichlorotrifluoroethane (b.p. 47.6° C./760 mm) were charged to a still equipped with a fractionating column. This mixture was heated to reflux and then distilled. A fraction boiling at 24.9° C. at 760 mm pressure was collected. Redistillation of this fraction showed no change in boiling point or composition. This fraction was analyzed by gas liquid chromatography and found to possess the following composition.

| | |
|---|---|
| 1,2-difluoroethane . . . | 43 weight percent |
| 1,1,2-trichloro-trifluoroethane . . . | 57 weight percent |

EXAMPLE II

In order to demonstrate the performance of the novel compositions of the invention in a typical low temperature Rankine cycle system, a comparison was made of the performance of the true azeotrope (43 weight percent 1,2-difluoroethane and 57 weight percent 1,1,2-trichlorotrifluoroethane) with 1,1,2-trichlorotrifluoroethane. A comparison was not made with the 1,2-difluoroethane component since this material is not as useful as a working fluid in Rankine cycle applications in view of its flammability. (1,2-Difluoroethane exhibits a flash point when measured by the Tag Open Cup Test-(ASTM D1310-72.)) The comparison is based on the Rankine cycle efficiency for these fluids. The data are based upon 100 percent turbine efficiency and although are not accurate on an absolute basis, are competent for the purpose of showing relative efficiency values.

In the typical low temperature a Rankine cycle system chosen, a feed pump takes saturated liquid at low pressure (Condition 1) and pumps it to high pressure (Condition 1-A). At this point the fluid enters the boiler where heat is applied. This causes the fluid temperature to increase until boiling is achieved (Condition 2). Further heating in the boiler vaporizes the fluid until only saturated vapor remains (Condition 3). The vapors are then passed through an expansion engine where they expand at constant entropy or nearly so dependent on the engine efficiency. During the expansion process, useful work is done by the expansion engine and the vapors exit at a lower temperature and pressure (Condition 4). The vapors are then cooled further in a condenser where they again reach saturation conditions (Condition 5). Further cooling causes the vapors to condense to the saturated liquid condition (Condition 1), thus completing the cycle.

Referring to the point conditions above, the enthalpy of the liquid or vapor for the working fluid can be defined as well as the Efficiency of the system.

The Efficiency is given by:

Efficiency =

$$\frac{\text{Enthalpy Condition 3} - \text{Enthalpy Condition 4} - \text{Pump Work}}{\text{Enthalpy Condition 3} - \text{Enthalpy Condition 1}}$$

Table I compares the condition at various points of $CCl_2FCClF_2$ and the azeotrope for a cycle operating at a boiler temperature of 300° F and a condenser temperature of 120° F.

TABLE I

| | $CCl_2FCClF_2$ | Azeotrope |
|---|---|---|
| Pressure Boiler, psia | 173.5 | 369.1 |
| Pressure Condenser, psia | 15.36 | 33.55 |
| Enthalpy, Point 1, BUT/lb | 34.42 | 15.80 |
| Enthalpy, Point 3, " | 122.06 | 151.39 |
| Enthalpy, Point 4, " | 106.13 | 125.09 |
| Enthalpy, Point 5, " | 96.08 | 122.32 |
| Pump Work, BTU/lb | 0.312 | 0.802 |
| Liquid Volume, Point 1, cu ft/lb | 0.0107 | 0.0129 |
| Efficiency × 100 | 17.82 | 18.81 |

An analysis of Table I shows that the azeotrope would give a 5.6% improvement (18.81 − 17.82)/17.82 in Efficiency when operating over the temperature range described. In addition, the azeotrope has the advantage of less volume flow per unit of power and the ability to utilize lower condenser temperatures without having subatmospheric pressures.

The thermodynamic data referred to in the above Table were computed. Such computation is based on measurement of the following:

a. Critical Properties (Temperature, Pressure, Volume)
b. Vapor Pressure
c. Liquid Density
d. Vapor Heat Capacity Representative data used in obtaining the thermodynamic properties of the azeotrope are as follows:

| | | | |
|---|---|---|---|
| (a) | Chemical Composition (wt %) | | |
| | 1,1,2-trichloro-1,2,2-trifluoroethane (R-113) | | 57 |
| | 1,2-difluoroethane (R-152) | | 43 |
| (b) | Molecular Weight | | 104.6 |
| (c) | Critical Temp. ° C | | 186.2 |
| (d) | Critical Press. psia | | 682.4 |
| (e) | Critical Density gm/cc | | 0.4517 |
| (f) | Critical Volume cc/gm | | 2.2138 |
| (g) | Liquid Density | | |
| | Temp. ° C | Liquid Density (gm/cc) | |
| | 21.2 | 1.3000 | |
| | 65.4 | 1.1995 | |
| | 103.2 | 1.0992 | |
| | 133.1 | 0.9989 | |
| | 156.8 | | |
| | 156.8 | | |
| | 173.0 | 0.7989 | |
| (h) | Vapor Pressure | | |
| | Temp. ° C | V.P. (psia) | |
| | 0.0 | 5.32 | |
| | 50.0 | 34.76 | |
| | 100.0 | 135.4 | |
| | 150.0 | 376.6 | |
| | 180.0 | 620.4 | | i. Vapor Heat Capacity

The published data for R-152 and R-113 were used to obtain an equation for the vapor heat capacity of the R-152/R-113 azeotrope.

From this data and using standard thermodynamic equations and techniques, thermodynamic tables were generated for the azeotrope. These tables relate the properties of enthalpy, entropy, pressure volume and temperature.

The azeotrope exhibits no flash point when subjected to the Tag Open Cup Test (ASTM D1310-72).

Additives, such as lubricants, corrosion inhibitors and others may be added to the novel compositions of the invention, for a variety of purposes provided they do not have an adverse influence on the compositions for their intended application.

Some specific applications which may be mentioned as being exemplary for use of the subject power fluids include the utilization of energy from turbine exhaust gases. The recovery of heat in a variety of chemical synthesis plants and its conversion to mechanical energy to operate various auxiliary equipment.

The novel compositions of the invention also possesses good heat transfer properties and other characteristics which make them useful as refrigerants. These novel fluids are especially suited for use in the split-cycle type refrigeration systems in which the fluid serves both as a refrigerant and as a power fluid, which in its power fluid capacity, drives the compressor and other components.

In addition to Rankine cycle and refrigerant applications, the constant boiling composition of the invention are also useful as aerosol propellants, expansion agents such as for polyolefin and polyurethane foams, liquid dielectrics and as solvents for a variety of industrial applications.

We claim:

1. Constant boiling mixtures consisting essentially of about 43 weight percent of 1,2-difluoroethane and about 57 weight percent 1,1,2-trichlorotrifluoroethane.

2. Constant boiling mixtures according to claim 1 which boil at about 24.9° C. at 760 mm.

3. The method for converting heat energy to mechanical energy which comprises vaporizing a fluid comprising a composition as described in claim 1 by passing the same in heat exchange relationship with a heat source, and utilizing the kinetic energy of the resulting expanding vapors to perform work.

4. The process according to claim 3 in which the fluid vaporized comprises a composition according to claim 2.

* * * * *